United States Patent
Wang

(10) Patent No.: US 9,524,352 B1
(45) Date of Patent: Dec. 20, 2016

(54) SHARING DATA ACROSS PARTNER WEBSITES

(71) Applicant: Google Inc., Mountain View, CA (US)

(72) Inventor: Gang Wang, Frederick, ME (US)

(73) Assignee: Google Inc., Mountain View, CA (US)

( * ) Notice: Subject to any disclaimer, the term of this patent is extended or adjusted under 35 U.S.C. 154(b) by 129 days.

(21) Appl. No.: 14/332,213

(22) Filed: Jul. 15, 2014

(51) Int. Cl.
 *G06F 15/16* (2006.01)
 *G06F 17/30* (2006.01)
 *H04L 29/08* (2006.01)

(52) U.S. Cl.
 CPC ......... *G06F 17/30902* (2013.01); *H04L 67/02* (2013.01)

(58) Field of Classification Search
 CPC ................................ H04L 67/02; H04L 67/04
 USPC ................................................. 709/217, 218
 See application file for complete search history.

(56) References Cited

U.S. PATENT DOCUMENTS

| | | | |
|---|---|---|---|
| 6,421,768 B1 | 7/2002 | Purpura | |
| 7,266,512 B2 | 9/2007 | Cohn et al. | |
| 2003/0229900 A1* | 12/2003 | Reisman | G06F 17/30873 725/87 |
| 2013/0046869 A1* | 2/2013 | Jenkins | H04L 67/22 709/223 |

\* cited by examiner

*Primary Examiner* — Wing F Chan
*Assistant Examiner* — Andrew Woo
(74) *Attorney, Agent, or Firm* — Fish & Richardson P.C.

(57) ABSTRACT

Methods, systems, and apparatus include computer programs encoded on a computer-readable storage medium, including a method for providing content. An indication of receipt of a request is received from a user device to navigate to a first web based resource. The request includes an appended cookie when one is available on the requesting device. Partner web based resources are identified in a co-operative that includes the first web based resource. A code segment is provided that is configured to send, to respective entities associated with the identified partner web based resources, a second request to share user data with the first web based resource. The shared user data is data collected by a respective partner web based resource and is associated with the user device. The shared data is data that was collected by an entity associated with the respective partner web based resource and associated with the user device.

19 Claims, 5 Drawing Sheets

SHARING DATA ACROSS PARTNER WEBSITES

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented. Users may be more likely to interact with content items if the content items are chosen, for example, using user information shared by partner websites.

SUMMARY

In general, one innovative aspect of the subject matter described in this specification can be implemented in methods that include a computer-implemented method for providing content. The method includes receiving an indication of receipt of a request from a user device to navigate to a first web based resource, wherein the request includes an appended cookie when one is available on the requesting device, the cookie having been loaded onto the user device based on a prior navigation by the user device to the first web based resource. The method further includes identifying, using one or more processors, one or more partner web based resources that are in a co-operative that includes the first web based resource. The method further includes providing, responsive to the request, a code segment that is configured to send, to respective entities associated with one or more of the identified partner web based resources in the co-operative, a second request to share user data with the first web based resource, the shared user data being data collected by a respective partner web based resource and being associated with the user device.

These and other implementations can each optionally include one or more of the following features. The shared user data can be user browsing history data. The shared user data can be derived from user browsing history data. The method can further include receiving the shared user data directly from one or more servers associated with partner websites responsive to respective second requests that are generated when the code segment is executed at a time of rendering the first web based resource. The method can further include using the shared user data to re-market content to the user. The method can further include receiving from the user device and in response to the provided web based resource the shared user data, wherein the shared user data is received from a browser associated with the user device responsive to respective second requests that are generated when the code segment is executed at a time of rendering the web based resource. The method can further include using the shared user data to re-market content to the user. The method can further include analyzing received shared user data to infer one or more of demographic, interest or preferences, and using the analysis to determine one or more content items for delivery to the user device. The method can further include using the shared user data to select content for delivery to the user device. The method can further include receiving a web page and augmenting the webpage using the generated code segment.

In general, another innovative aspect of the subject matter described in this specification can be implemented in methods that include another computer-implemented method for providing content. The method includes receiving a user request from a user device to navigate to a first web based resource. The method further includes locating a first-party cookie associated with the first web based resource, the first-party cookie having been loaded onto the user device based on a prior navigation by the user device to the first web based resource. The method further includes attaching, using one or more processors, the first-party cookie to the user request to form a first request, and providing the first request to a server associated with the first web based resource. The method further includes receiving, responsive to the first request, a resource, the resource including a code segment that is configured to send second requests to one or more partner web based resources in a co-operative to share user data with the first web based resource. The method further includes rendering the resource, including executing the code segment, wherein executing the code segment includes transmitting at least one second request to a server associated with an indicated partner web based resource.

These and other implementations can each optionally include one or more of the following features. The method can further include: receiving, responsive to the at least one second request, shared user data from a respective partner web based resource, wherein the shared user data is data that was collected by the respective partner web based resource and being associated with the user device; and providing the shared user data to a server associated with the first web based resource. The shared user data can be user browsing history data. The shared user data can be derived from user browsing history data. The method can further include determining a communication method for communication of the shared user data and receiving the shared user data includes receipt by the determined communication method. The at least one second request can include a cookie for the partner web based resource that has been stored in a browser of the user device. The method can further include determining when there is a cookie for the partner web based resource stored on the user device, and wherein sending the at least one second request includes sending the determined cookie along with a respective second request. The at least one second request identifies the user device and includes a first identifier that identifies a browser associated with the user device and a second identifier that identifies the first web based resource in the co-operative. The method can further include encrypting the first identifier and the second identifier prior to transmission of the at least one second request. Receiving, responsive to the at least one second request, the shared user data can further include receiving the shared user data as a response to a second request and through a browser associated with the user device. The method can further include providing plural second requests, including at least one to two different partner web based resources in the co-operative, and receiving shared user data responsive to both requests. The method can further include supporting collecting and warehousing data in the co-operative at a central location, wherein the at least one second request includes a request for all shared user data from the central location and includes a plurality of cookies that are known to the user device and that are associated with partners in the co-operative.

In general, another innovative aspect of the subject matter described in this specification can be implemented in computer program products that include a computer program product tangibly embodied in a computer-readable storage device and comprising instructions. The instructions, when executed by one or more processors, cause the processor to: receive an indication of receipt of a request from a user device to navigate to a first web based resource, wherein the request includes an appended cookie when one is available on the requesting device, the cookie having been loaded onto the user device based on a prior navigation by the user device to the first web based resource; identify one or more partner web based resources that are in a co-operative that includes the first web based resource; and provide, responsive to the request, a code segment that is configured to send, to respective entities associated with one or more of the identified partner web based resources in the co-operative, a second request to share user data with the first web based resource, the shared user data being data collected by a respective partner web based resource and being associated with the user device.

In general, another innovative aspect of the subject matter described in this specification can be implemented in systems, including a system comprising one or more processors and one or more memory elements including instructions. The instructions, when executed, cause the one or more processors to: receive an indication of receipt of a request from a user device to navigate to a first web based resource, wherein the request includes an appended cookie when one is available on the requesting device, the cookie having been loaded onto the user device based on a prior navigation by the user device to the first web based resource; identify one or more partner web based resources that are in a co-operative that includes the first web based resource; and provide, responsive to the request, a code segment that is configured to send, to respective entities associated with one or more of the identified partner web based resources in the co-operative, a second request to share user data with the first web based resource, the shared user data being data collected by a respective partner web based resource and being associated with the user device.

Particular implementations may realize none, one or more of the following advantages. Members of a data co-op (e.g., a plurality of partner websites) can collect and aggregate information associated with users' browsing behavior across multiple partner websites in the co-op, without needing to rely, e.g., on third-party cookies, which may be blocked by some browsers. Content can be selected based on information about a user's browsing behavior across multiple websites while relying on first-party cookies only.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
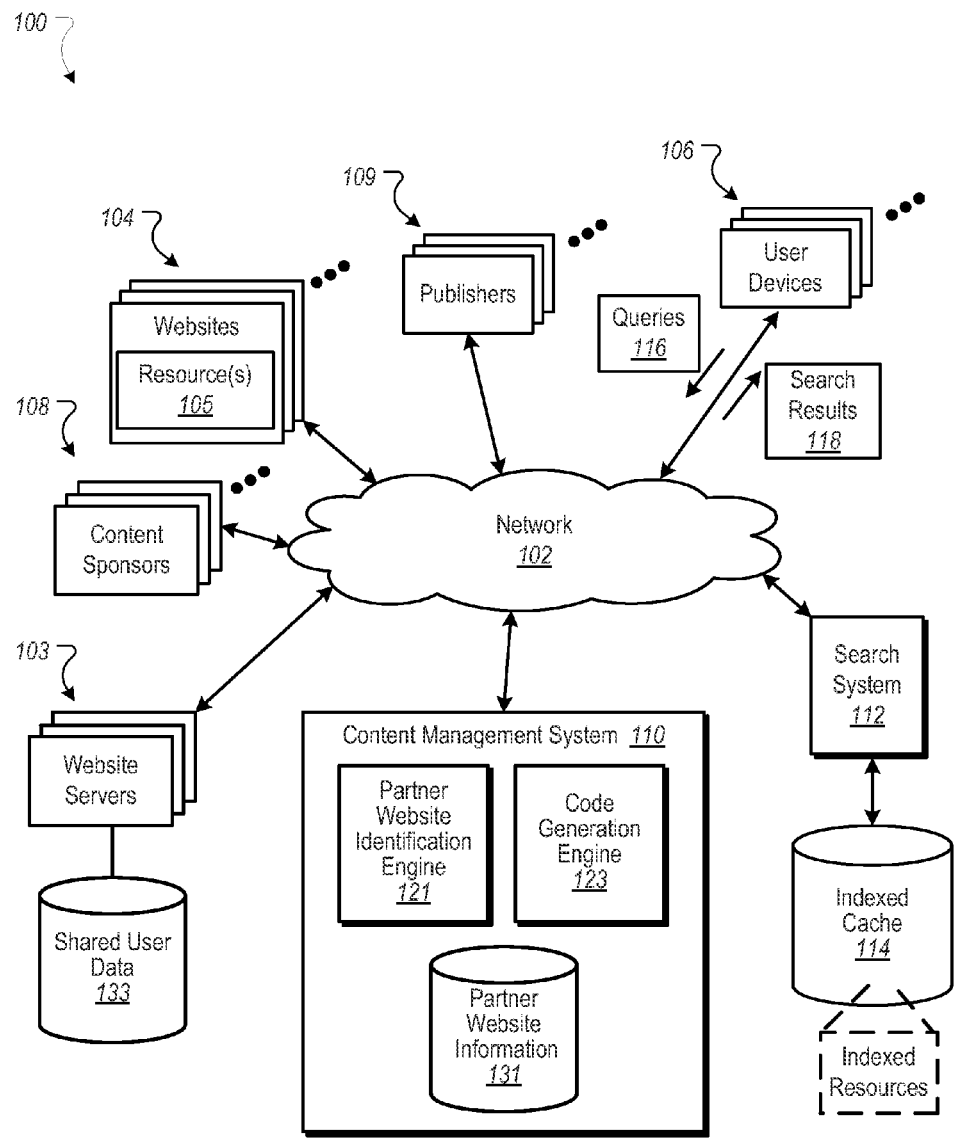
FIG. 1 is a block diagram of an example environment for providing content.

Systems, methods, and computer program products are described for sharing user data among partner web based resources (e.g., websites). For example, a user may be using a browser on a user device to select or identify a first website for viewing content. As a result, a content management system, for example, can receive directly or indirectly, from a website server associated with the first website, an indication of receipt of a request from the user device to navigate to the first website. If a cookie associated with the first website already exists on the user's user device, for example, then the indication can include an appended cookie, e.g., a copy of the cookie that was loaded onto the user device during a prior navigation by the user device to the first website. The content management system can identify plural partner websites that are in a same group (e.g., a partnership, or a co-operative) for sharing user data that is known by the entities associated with the partner websites about the user. For each of the plural partner websites that are identified, a code segment can be generated, the code for requesting shared user data from each of the identified partner websites. When the website server provides the requested page associated with the first website in response to the request, for example, the requested page can be augmented to include the code segment. The code segment can be used, for example, at the browser to request, from each of the partner websites, shared user data associated with the user and the particular partner website.

In some implementations, co-operatives can set rules and/or permissions regarding how the shared user data can be shared and/or used, e.g., to protect the privacy and security of users while still enabling the selection of relevant content in certain situations. For example, the rules and/or permissions can include, or be based on, applicable business, legal, privacy, co-op rules and/or agreements.

For situations in which the systems discussed here collect and/or use personal information about users, the users may be provided with an opportunity to enable/disable or control programs or features that may collect and/or use personal information (e.g., information about a user's social network, social actions or activities, a user's preferences, a user's website browsing history, or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

In some implementations, users can control whether and how their browsing behavior and/or other information is collected and/or shared by co-operatives. For example, user specifications can be made on a per-device, a per-time-of-day, and/or a per-website basis. In some implementations, users can be provided with a user interface for making selections as to whether and how their browsing behavior and/or other information can be collected and/or shared. In some implementations, users can be notified that their information is going to be shared among members of a co-operative, and the users can be given an opportunity to accept or decline. Other controls are possible.

FIG. 1 is a block diagram of an example environment 100 for providing content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, website servers 103, user devices 106, content sponsors 108 (e.g., advertisers), publishers 109, and the content management system 110. The example environment 100 may include many thousands of websites 104, website servers 103, user devices 106, content sponsors 108 and publishers 109.

Website servers 103, for example, are servers for websites 104, and as such, handle page requests associated with corresponding websites 104. For example, a website server 103 associated with a particular website 104 can handle a request for a webpage. Other forms of requests are possible. A requested webpage may also include slots for other content. For example, in response to a page request received at a website server 103, the website server 103 may deliver a resource (e.g., a webpage) to a user device. The webpage may include code segments, for example, to request content to fill slots on the page at the time of rendering at the user device. Other code segments, such as code segments to retrieve partner data from one or more partner websites based on first-party cookies, can also be appended or otherwise included in the webpage. Generation of the code segments is discussed in greater detail below.

The environment 100 can include plural data stores, which can be stored locally by the content management system 110 or at the website servers 103, stored somewhere else and accessible using the network 102, generated as needed from various data sources, or some combination of these. Further, some data stores described herein may include identifiers that can be used to match or access corresponding data records or other information that are stored elsewhere, e.g. locally and/or remotely.

A data store of partner website information 131, for example, can include information that identifies partner websites that belong to the same group or co-operative along with other related information. For example, the related information can identify how user data is to be shared among partner websites, including information that identifies communication protocols that can be used for sharing the shared user data, restrictions on use, or other data related to use or processing of shared information.

A data store of shared user data 133, for example, can include information, on a per-user and per-website basis, that includes user or user device data, such as cookies, browsing history, user information (e.g., demographics), and information that can be derived or inferred from the shared user information. In some implementations, the data store of shared user data 133 can store timestamps associated with the shared user data, e.g., to be used to expire (or otherwise avoid the use of) shared user data that is older than a default age. Although shown in FIG. 1 as a single data store, the data store of shared user data 133 can collectively include data stores stored at, or available to, each of the corresponding website servers 103. In some implementations, some or all of the data store of shared user data 133 can be stored at a central location, e.g., by the content management system 110.

The content management system 110 can include plural engines, some or all of which may be combined or separate, and may be co-located or distributed (e.g., connected over the network 102). A partner website identification engine 121, for example, can identify one or more partner websites that are in a co-operative that includes a particular first website. For example, the partner website identification engine 121 can use information stored in the data stores to identify partner websites that have data-sharing agreements with a particular first website.

A code generation engine 123, for example, can generate a code segment that is configured to send a second request (e.g., for shared user data) to one or more identified partner websites associated with a particular first website. In some implementations, the code segment 210 can be implemented using Hyper-text Mark-up Language (HTML), JavaScript™, or some other code or script. In some implementations, the code segments are generated in real time after a request for a webpage has been received. In some implementations, the code generation engine is part of a respective webserver that receives a navigation request to return a webpage. In some implementations, operations of the code generation engine are split between plural different devices, such that certain functions are performed by different entities (e.g., some portions by the web server 103 and some portions by the content management system 110).

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., universal resource locator (URL)) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In addition, when no search is performed or no keywords are available (e.g., because the user is not browsing a webpage), other information, such as information obtained from one or more snapshots, can be used to respond to the received request. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
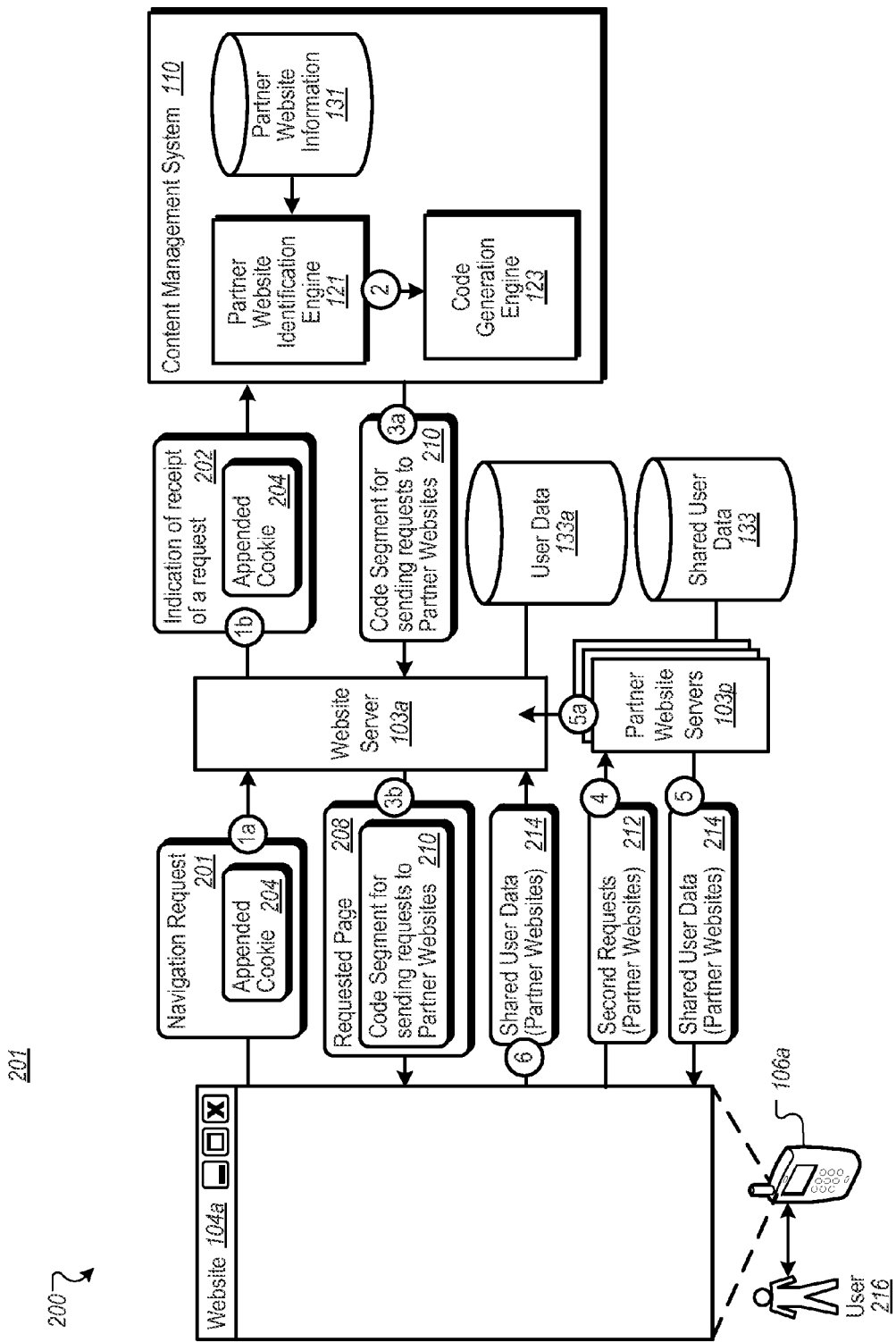
FIG. 2 shows an example system for sharing user data among partner websites.

FIG. 2 shows an example system 200 for sharing user data among partner web based resources. For example, a website server 103a can receive a navigation request 201 from a user device 106a to navigate to a first website 104a (e.g., one of the websites 104). The navigation request 201 that is received can include (or be received with) an appended cookie 204, e.g., that has been loaded onto the user device 106a during a prior navigation by the user device 106a to the first website 104a. The website server 103a can provide the requested resource in response to the navigation request. When the resource is rendered on the requesting device, one or more content item requests can be generated and provided to a content management system for filing in slots on the requested resource. A content item request can include the appended cookie. That is, the content management system 110 can receive (or have forwarded) the appended cookie 204 as an indication 202 of a receipt of a corresponding page request, i.e., that the server has received a page request for which the cookie is associated. In some implementations, the content management system 110 can receive a notification of the page request in the form of a notice directly from the respective web server 103a. The notification can include the cookie, along with a request to identify one or more partners that are associated with the website that received the request. The content management system 110 can receive the appended cookie 204 (or information related thereto), and can determine one or more partner websites (e.g., identified from partner website information 131) based on, e.g., an identification of the website associated with the page request and/or an associated URL. For each of plural identified partner websites, for example, the code generation engine 123 can generate, within a single or plural code segment(s) 210, code for requesting user data from each of the identified partner websites. A requested page 208 provided by the website server 103a in response to the navigation request 201 can be augmented to include the code segment(s) 210. That is, in response to the notification received from the web server 103, a segment can be returned for inclusion in the requested webpage. In some implementations, the following example stages can be used for sharing user data among partner websites.

At stage 1a, for example, the website server 103a can receive the navigation request 201 from the user device 106a to navigate to the first website 104a. The navigation request 201 can include the appended cookie 204 when one is available on the user device 106a. For example, the cookie may be available because the cookie has been previously loaded onto the user device 106a based on a prior navigation by the user device 106a to the first website 104a.

At stage 1b, for example, the website server 103a can directly or indirectly provide the appended cookie 204 to the content management system 110. For example, the appended cookie 204 can be provided directly by the website server 103a along with the indication 202 that the website server 103a has received a request (e.g., for the first website 104a).

At stage 2, for example, the partner website identification engine 121 can identify one or more partner websites 104 that are in a group (hereinafter referred to as a co-operative) that includes the first website 104a. For example, the partner website identification engine 121 can use information stored in the data store of partner website information 131 (along with information in the received appended cookie 204, that identifies the first website 104a) that specifies which other websites 104 have data-sharing agreements with the first website 104a.

At stage 3a, for example, the code generation engine 123 can generate the code segment(s) 210 that is configured to send a second request to one or more of the identified partner websites. The content management system 110 can provide the code segment 210 to the website server 103a. In some implementations, the code segment 210 can include information that identifies a user device (which may be associated with user 216), e.g., so that a partner website server 103 that receives the code segment 210 can determine what user the second request 212 is associated with. For example, the included information can include an ID that is assigned to the user in association with the first website 104a. The first website's cookie dropped to user's browser can also carry the same ID so that the first website can be associated with the user's browsing activity on the website and user data that other partners in the co-op shared with the entity associated with the first website.

At stage 3b, for example, the website server 103a can use the received code segment 210 to augment, be added to, or otherwise included in the requested page 208. For example, the website server 103a can include the code segment 210 with the requested page 208 that is provided to the user device 106a in response to the navigation request 201.

At stage 4, for example, respective second requests 212 are generated. For example, execution of the code segment 210 at a time of rendering the requested page 208 on the user device 106a can cause each of the respective second requests 212 to be generated. Each second request 212 can be, for example, a request sent to a particular partner website server 103p that is associated with the corresponding identified partner website. The request, for example, can be a request to share user data with the first website 104a, e.g., the shared user data being data that was collected by a respective partner website and being associated with the user device 106a. In some implementations, the request can include, e.g., an identifier of the first website 104a, a user identifier (e.g., for the user 216), and one or more partner websites' cookies previously dropped to the user's browser.

At stage 5, for example, the user device 106a can receive, responsive to the second requests 212, shared user data 214 directly from one or more partner website servers 103p associated with the identified partner websites. For example, the shared user data 214 can include user data associated with the user 216 and that is further associated with respective ones of the identified partner websites. The shared user data can include, for example, user browsing history data, or data that is derived from user browsing history data, purchase history, total spent on a partner website, data that the user enters into a second website (e.g., along the lines of "I told social network A my hometown"), data that the second website licensed from other parties, and/or data derived from any combination thereof. In some implementations, partner web based resources may share data with a first web based resource (e.g., an entity associated with the first web based resource) either once for each sharing request from the first web based resource or repetitively thereafter when the partner web based resource has more data to share in the future. In some implementations, the sharing can end based on a request received from the first web based resource or at a different time, such as based on co-op rules.

At stage 6, for example, a browser (or other application) executing on the user device 106a can provide the shared data 214 to the website server 103a for storage, e.g., in user data 133a. For example, at any given time, user data 133a can include shared user data 133 received from partner website servers 103p (e.g., in addition to user data associated with the website 104a and stored by the website server 103a).

In some implementations, at stage 5a, for example, the partner website servers 103p can provide the shared user data directly to the website server 103a, e.g., for storage in the user data 133a. Stage 5a, for example, can take the place of stages 5-6, such as when website servers share shared user data directly.

Figure 3A:
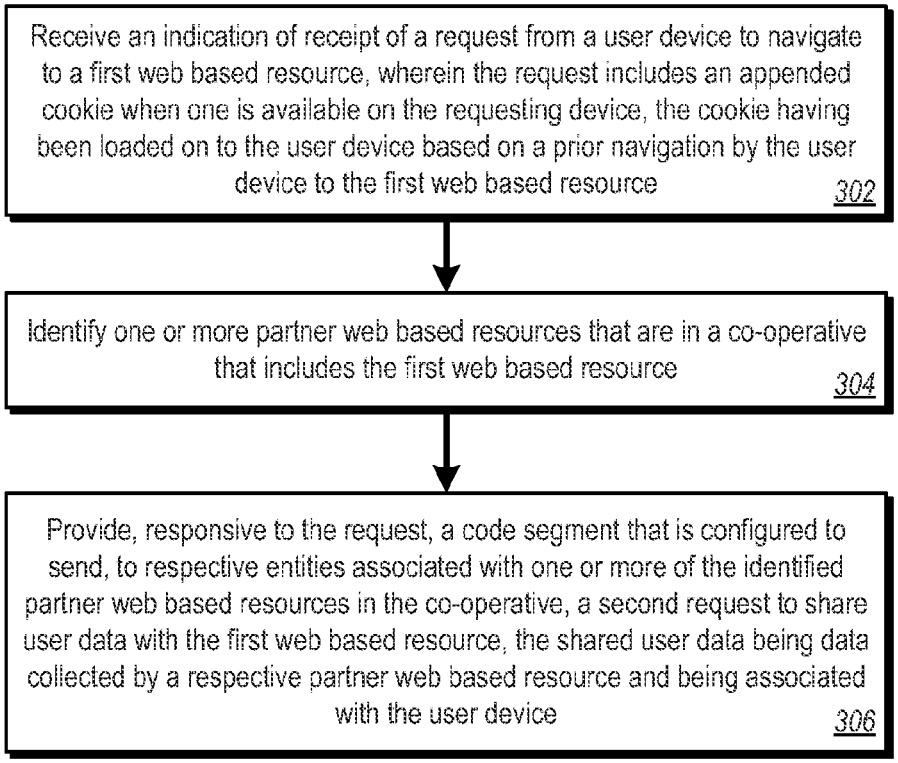
FIG. 3A is a flowchart of an example process for sharing user data among partner websites.

FIG. 3A is a flowchart of an example process 300 for sharing user data among partner websites. In some implementations, the content management system 110 can perform steps of the process 300 using instructions that are executed by one or more processors. FIGS. 1-2 are used to provide example structures for performing the steps of the process 300.

An indication is received of receipt of a request from a user device to navigate to a first website (302). The request includes an appended cookie when one is available on the requesting device, the cookie having been loaded onto the user device based on a prior navigation by the user device to the first website. For example, content management system 110 can receive the indication 202 of a receipt by the website server 103a of the navigation request 201. The indication 202 can include, for example, the appended cookie 204, e.g., appended to the indication 202 by the website server 103a. For example, the appended cookie 204 can be appended to the navigation request 201 that is sent by the user device 106a to the website server 103a when requesting navigation to the first website 104a. The appended cookie 204 can be include with the navigation request 201 and forwarded to the content management system 110, for example, when the cookie is available on the requesting device (e.g., the user device 106a), the cookie having been loaded onto the user device based on a prior navigation by the user device 106a to the first website 104a.

One or more partner websites are identified that are in a group (e.g., a co-operative) that includes the first website (304). The partner website identification engine 121, for example, can identify one or more of partner websites that are in a co-operative that also includes the first website 104a. Partner websites may be in the same co-operative, for example, because they cater to users having similar demographics, are part of a same corporate group, are strategic segments in a business flow (e.g., an online sales website and an online payment website), related to related verticals (e.g., travel/accommodations and booking), and/or for some other reason for forming a co-operative. The partner website identification engine 121, for example, can use information stored in the data store of partner website information 131 that specifies which other websites 104 have data-sharing agreements with the first website 104a.

A code segment is provided that is configured to send, to respective entities associated with one or more of the identified partner web based resources in the co-operative, a second request to share user data with the first web based resource, the shared user data being data collected by a respective partner web based resource and being associated with the user device (306). For example, the content management system 110 can provide the code segment 210 that is configured to send a second request to one or more of the identified partner websites to share user data with the first website, the shared user data being data that was collected by a respective partner website and being associated with the user device. The code generation engine 123, for example, can generate the code segment 210 that is operable to send second requests for shared user data to each of the identified partner websites. Each second request, for example, can be a request to share user data with the first website 104a. In some implementations, the second request to share user data with the first web based resource can also include, in the request, to share user data with web based resources specified by the first web based resource and/or others permitted by one or more co-op rules.

In some implementations, the shared user data can be user browsing history data. For example, in response to the second requests 212, the identified partner websites can share or provide shared user data 214 that includes user browsing history associated with browsing that the user 216 has done on the respective ones of the identified partner websites.

In some implementations, the shared user data can be derived from user browsing history data. As an example, instead of (or in addition to) providing browsing history data, the identified partner websites can share or provide user information (e.g., browsing statistics, user interests) corresponding to the browsing history data associated with the user 216.

In some implementations, the process 300 can further include receiving the shared user data directly from one or more partner websites responsive to respective second requests that are generated when the code segment 210 is executed at a time of rendering the page. For example, for some of the identified partner websites, when the code segment 210 executes at the time that the first website 104a is rendered, shared user data can be obtained directly from the identified partner websites without relying on the content management system 110 to generate a code segment for generating the requests. In some implementations, the process 300 can further include using the shared user data to re-market content to the user. For example, the shared user data obtained directly from the partner websites can be used to select content (e.g., advertisements) for presentation on the user device 106a.

In some implementations, the process 300 can further include receiving, from the user device and in response to the provided page, the shared user data, wherein the shared user data is received from a browser associated with the user device responsive to respective second requests that are generated when the code segment 210 is executed at a time of rendering the page. For example, instead of obtaining the shared user data from the identified partner websites, the shared user data can be obtained from a browser executing on the user device 106a (e.g., from locally-stored cookies of identified partner websites) when resources of the identified partner websites are presented on the user device 106a. In some implementations, the process 300 can further include using the shared user data to re-market content to the user. For example, the shared user data obtained from the browser can be used to remarket content (e.g., by way of selecting advertisements) for presentation on the user device 106a. In some implementations, shared user data can be received in other ways, e.g., from within in-app ads in which the ad is rendered inside a web-view or other stripped-down version of a web browser (or other technology that may not directly be inside a browser).

In some implementations, the process 300 can further include analyzing received shared user data to infer one or more of demographic, interest or preferences, and using the analysis to determine one or more content items for delivery to the user device. For example, shared user data received for the respective identified partner websites can be used to determine information for the user 216 that is associated with particular demographics, interests and/or preferences (e.g., to share information that a user likes fast cars without sharing the user's browsing history). In some implementations, some or all of the second requests 212 can be routed through the content management system 110, e.g., for the purpose of inferring one or more of demographic, interest or preferences, and using the analysis to determine one or more content items for delivery to the user device 106a or for other purposes.

In some implementations, the process 300 can further include using the shared user data to select content for delivery to the user device. The content management system 110, for example, can use the shared user data 214 to make selections of content (e.g., advertisements) in response to requests for content received from the user device 106a, such as to fill content item slots.

In some implementations, the process 300 can further include receiving a webpage and augmenting the webpage using the generated code segment. For example, the content management system 110 can receive a webpage, such as from a website server 103. Using partner website information 131, for example, the code generation engine 123 can generate the code segment 210 that is inserted, at the content management system 110, into the webpage.

Figure 3B:
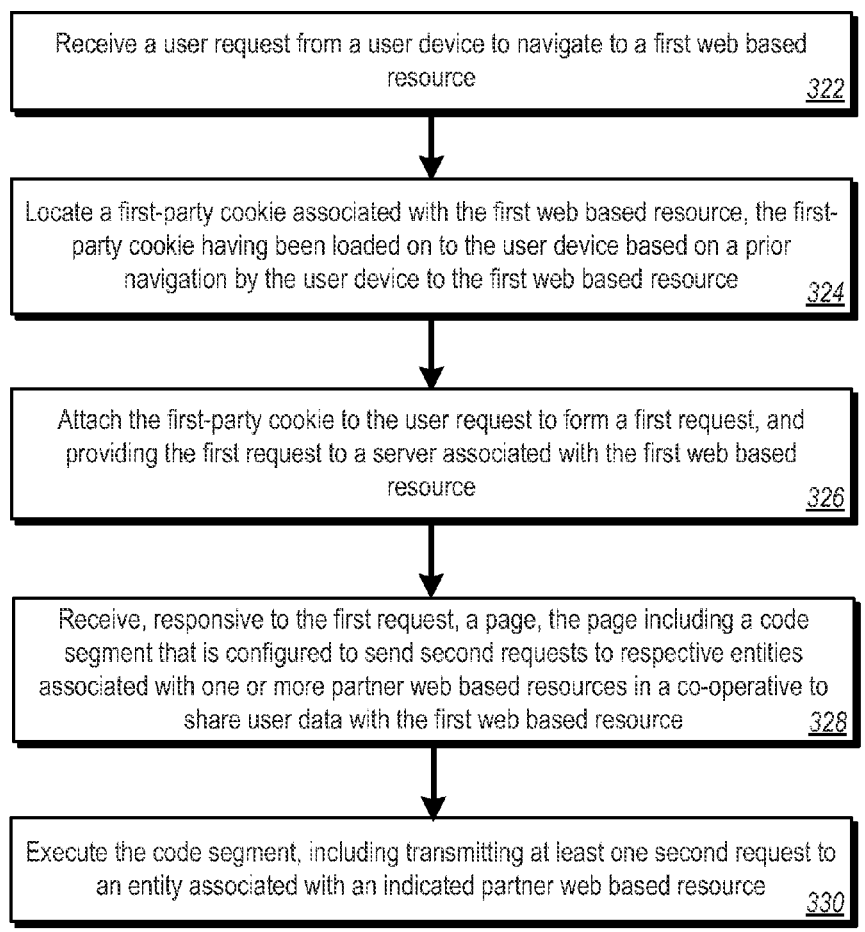
FIG. 3B is a flowchart of an example process for device-side requesting and receipt of shared user data from partner websites.

FIG. 3B is a flowchart of an example process 320 for device-side requesting and receipt of shared user data from partner web based resources. In some implementations, a browser and/or other application executing on the user's user device 106a can perform steps of the process 320 using instructions that are executed by one or more processors. FIGS. 1-2 are used to provide example structures for performing the steps of the process 320.

A user request is received from a user device to navigate to a first web based resource (322). For example, the user 216 can enter or select (e.g., by way of a control, or in a selection from a search results page in a browser) a URL of a website to be displayed.

A first-party cookie associated with the first web based resource is located, the first-party cookie having been loaded onto the user device based on a prior navigation by the user device to the first web based resource (324). For example, the user's browser can locate a cookie associated with the webpage, e.g., if the user has displayed that webpage on that device (e.g., the user device 106a) in the past.

The first-party cookie is attached to the user request to form a first request, and the first request is provided to a server associated with the first web based resource (326). For example, the user's browser or some other mechanism on the user device 106a can attach the cookie for processing by the website server 103 associated with the first website 104a, e.g., as the appended cookie 204 can be included in the navigation request 201.

A page is received, responsive to the first request, the page including a code segment that is configured to send second requests to one or more partner web based resources in a co-operative to share user data with the first web based resource (328). As an example, the user device 106a can receive the requested page 208, as described above with reference to FIGS. 2 and 3A. The requested page 208 can include, for example, the code segment 210 that is generated, e.g., by the code generation engine 123, as described above, and forwarded to the partner website server 103p. The code segment 210 includes code for making requests to each of the identified partner websites.

The page is rendered, including executing the code segment, wherein executing the code segment includes transmitting at least one second request to an indicated partner web based resource (e.g., to a website server 103 associated with a partner website) (330). For example, the user's browser (or other application on the user device 106a) can render the page associated with the first website 104a. The browser can also execute the code segment 210, e.g., that transmits second requests 212 to each of the identified partner web based resources.

In some implementations, the at least one second request can include a cookie for the partner website that has been stored in a browser of the user device. For example, when the browser executes the code segment 210 to create a particular one of the second requests 212, the cookie associated with the particular one of the corresponding identified partner websites can be included in the request.

In some implementations, the process 320 can further include determining when there is a cookie for the partner website stored on the user device, and sending the at least one second request can include sending the determined cookie along with a respective second request. For example, the browser can locate, on the user device 106a, the cookie associated with the particular one of the corresponding identified partner websites, and include the cookie in the second request(s) 212.

In some implementations, the at least one second request can identify the user and include a first identifier that identifies a browser associated with the user device and a second identifier that identifies the first website in the co-operative. For example, second requests 212 that are sent by the user device 106a can identify the user 216 and include identifiers for each of the browser(s) running on the user device 106a and an identifier for the first website 104a. In some implementations, the identifiers can include anonymous identifiers assigned by the first website to protect the user's privacy. In some implementations, the process 320 can further include encrypting (e.g., to protect user privacy) the first identifier and the second identifier prior to transmission of the at least one second request. For example, the browser or some other application on the user device 106a can use a one-way hash or some other encryption technique to encrypt the identifiers before they are included in the second request(s).

In some implementations, the process 320 can further include receiving, responsive to the at least one second request, shared user data from an entity associated with the respective partner website, wherein the shared user data is data that was collected by the respective partner website and is associated with the user device. For example, the shared user data 214 provided to the user device 106a can include, for each of the identified partner websites, shared user data that each of the respective identified partner websites has collected in association with the user device 106a. In some implementations, the process 320 can further include providing the shared user data to a server associated with the first website. For example, the shared user data 214 can be received by a server that exists on the user device 106a, e.g., for subsequent use by the browser or some other application on the user device 106a. In some implementations, the server (or one or more components thereof) can be remote to the user device 106a and can be accessible over the network 102. In some implementations, shared user data associated with a user device can include an identification of a currently logged-in user and/or information associated with cross-linked devices.

In some implementations, the shared user data can be user browsing history data. For example, in response to the second requests 212, the identified partner websites can share or provide the shared user data 214 that includes user browsing history associated with browsing that the user 216 has done on the respective ones of the identified partner websites.

In some implementations, the shared user data can be derived from user browsing history data. As an example, instead of (or in addition to) providing browsing history data, the identified partner websites can share or provide user information (e.g., browsing statistics, user interests, purchase history, total spending) corresponding to the browsing history data associated with the user 216.

In some implementations, the process 320 can further include determining a communication method for communication of the shared user data, and receiving the shared user data can include receipt by the determined communication method. For example, shared user data that is provided by (or obtained from) the identified partner websites can follow a different communication technique than the transaction described above that uses the second requests 212 and shared user data 214. For example, there can be some other communication protocol (e.g., pre-determined and agreed to by all parties) between the first website 104a and respective ones of the identified partner websites, e.g., defined and/or documented in the partner website agreements.

In some implementations, receiving the shared user data responsive to the at least one second request can further include receiving the shared user data as a response to a second request and through a browser associated with the user device. As an example, shared user data 214 that is received by the browser executing on the user device 106a can be in response to the second requests 212.

In some implementations, the process 320 can further include providing plural second requests, including at least one to two different partner websites in the co-operative, and receiving shared user data responsive to both requests. As an example, the second requests 212 can be plural second requests, each request being sent to the corresponding ones of the identified partner websites.

In some implementations, the process 320 can further include supporting collecting and warehousing data in the co-operative at a central location, wherein the at least one second request includes a request for all shared user data from the central location and includes a plurality of cookies that are known to the user device and that are associated with partners in the co-operative. For example, instead of (or in addition to) sending multiple second requests 212, a single request can be sent that requests available shared user data for a particular user device (e.g., associated with the user 216) and the first website 104*a*. The request can include, for example, cookies associated with each of the partner websites 104 associated with the first website 104*a*. The shared user data 214 that is provided, for example, can include shared user data, obtained from the central location in a single transaction, associated with the identified partner websites that are in the same co-operative as the first website 104*a*. In some implementations, types of requests related to the central location can include: a request for co-op members to share their data with the central location, and a request to retrieve data from the central location in order to use user data to deliver customized content to the user. In some implementations, when a web based resource sends a request to the entity associated with the partner web based resource to share data, the request can contain the first website's ID and the partner site's cookie. Using the information in the request, for example, the entity associated with the partner web based resource can know that the first site's ID and its own ID map to the same browser instance (or user). After the co-op processes enough sharing requests, every member in the co-op, including the central location, can know how to map one member's ID to another member's IDs.

Figure 4:
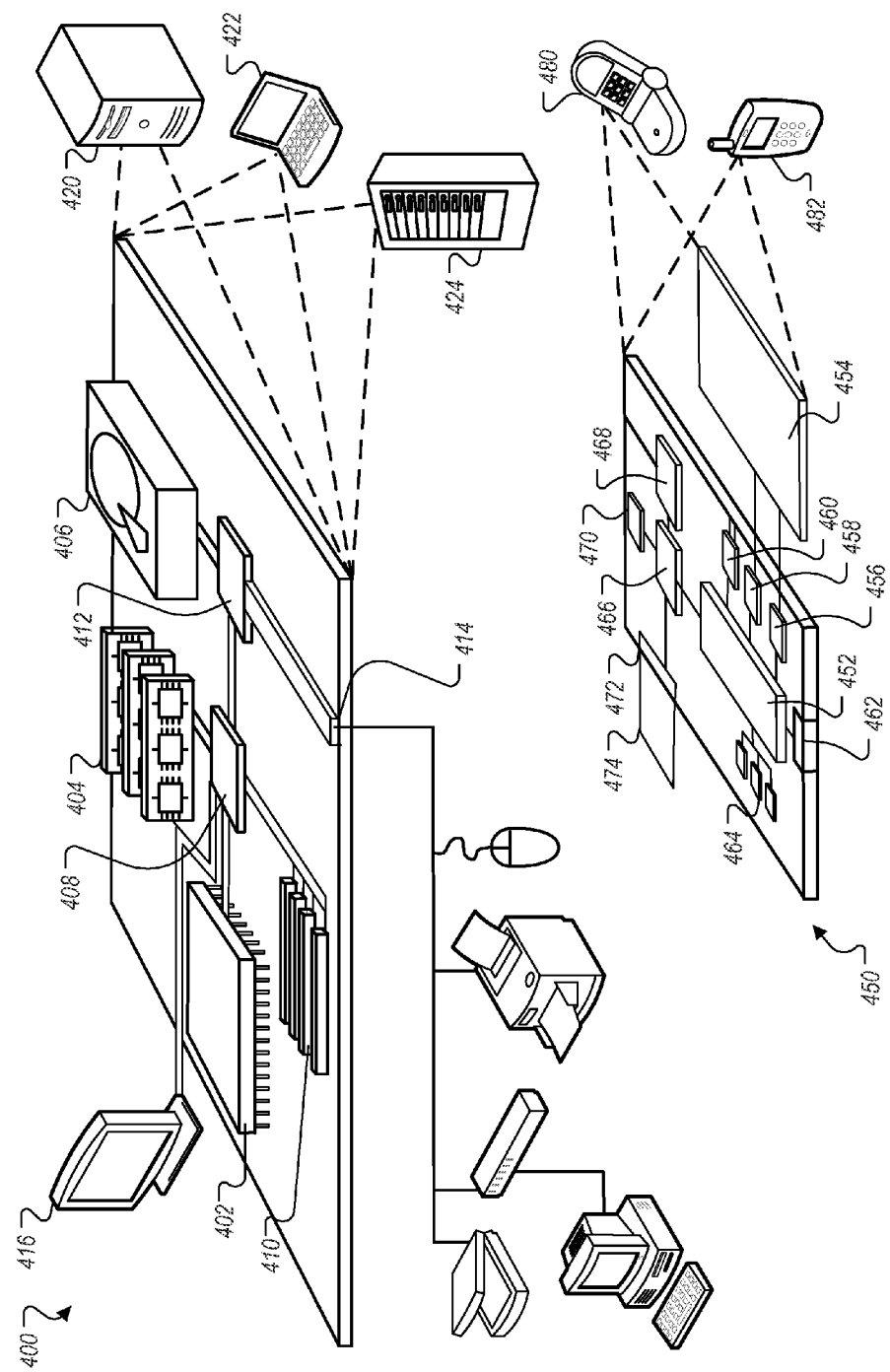
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a content management system from a web server, an indication of receipt of a request received by the web server from a user device, the request being to navigate to a first web based resource, wherein the request includes an appended cookie when the appended cookie is available on the user device, the appended cookie having been loaded onto the user device based on a prior navigation request by the user device to the first web based resource;
   identifying, by the content management system, one or more partner web based resources that are in a co-operative that (i) includes the first web based resource, and (ii) specifies that the one or more partner web based resources have one or more data-sharing agreements with the first web based resource;
   responsive to the request for which the indication is received, providing, to the web server by the content management system, a code segment that is configured to send, to one or more respective entities associated with the one or more partner web based resources specified in the co-operative, a second request to share, according to the one or more data-sharing agreements, shared user data with the first web based resource, the shared user data collected by the one or more partner web based resources specified and being associated with the user device;
   receiving the shared user data directly from the one or more partner web based resources responsive to respective second requests that are generated when the code segment is executed at a time of rendering the first web based resource; and
   using the shared user data to re-market content to a user.

2. The method of claim 1 wherein the shared user data is user browsing history data.

3. The method of claim 1 wherein the shared user data is derived from user browsing history data.

4. The method of claim 1 further comprising receiving from the user device and in response to the provided web based resource the shared user data, wherein the shared user data is received from a browser associated with the user device responsive to respective second requests that are generated when the code segment is executed at a time of rendering the web based resource.

5. The method of claim 4 further comprising using the shared user data to re-market content to the user.

6. The method of claim 1 further comprising analyzing received shared user data to infer one or more of demographic, interest or preferences, and using the analysis to determine one or more content items for delivery to the user device.

7. The method of claim 1 further comprising using the shared user data to select content for delivery to the user device.

8. The method of claim 1 further comprising receiving a web page and augmenting the web page using the generated code segment.

9. A computer-implemented method comprising:
   receiving, by a web server, a user request from a user device to navigate to a first web based resource;
   locating, by the web server, a first-party cookie associated with the first web based resource, the first-party cookie having been loaded onto the user device based on a prior navigation request by the user device to the first web based resource;
   attaching, using one or more processors, the first-party cookie to the user request to form a first request, and providing the first request to a server associated with the first web based resource;
   receiving, from a content management system and responsive to the first request, a page, the page including a code segment that is configured to send second requests to one or more respective entities associated with one or more partner web based resources in a co-operative to share user data with the first web based resource, the co-operative specifying that the one or more partner web based resources have one or more data-sharing agreements with the first web based resource;
   receiving, responsive to the at least one second request, shared user data from an entity associated with a respective partner web based resource, wherein the shared user data is data that was collected by the entity associated with the respective partner web based resource and being associated with the user device, wherein receiving, responsive to the at least one second request, the shared user data further comprises receiving the shared user data as a response to the at least one second request and through a browser associated with the user device;

providing the shared user data to a server associated with the first web based resource; and executing, by the web server, the code segment, including transmitting at least one second request to an entity associated with an indicated partner web based resource.

10. The method of claim 9 wherein the shared user data comprises user browsing history data.

11. The method of claim 9 wherein the shared user data is derived from user browsing history data.

12. The method of claim 9 further comprising determining a communication method for communication of the shared user data and wherein receiving the shared user data includes receipt by the determined communication method.

13. The method of claim 9 wherein the at least one second request includes a cookie, for the partner web based resource, that has been stored in a browser of the user device.

14. The method of claim 9 further comprising determining when there is a cookie for the partner web based resource stored on the user device, and wherein sending the at least one second request includes sending the determined cookie along with a respective second request.

15. The method of claim 9 wherein the at least one second request identifies the user and includes a first identifier that identifies a browser associated with the user device and a second identifier that identifies the first web based resource in the co-operative.

16. The method of claim 9 further comprising providing plural second requests, including at least one to two different partner web based resource in the co-operative, and receiving shared user data responsive to both requests.

17. The method of claim 9 further comprising supporting collecting and warehousing data in the co-operative at a central location, wherein the at least one second request includes a request for all shared user data from the central location and includes a plurality of cookies that are known to the user device and that are associated with partners in the co-operative.

18. A computer program product embodied in a non-transitory computer-readable medium including instructions, that when executed, cause one or more processors of a content management system to:

receive, from a web server, an indication of receipt of a request received by the web server from a user device, the request being to navigate to a first web based resource, wherein the request includes an appended cookie when the appended cookie is available on the user device, the appended cookie having been loaded onto the user device based on a prior navigation request by the user device to the first web based resource;

identify one or more partner web based resources that are in a co-operative that (i) includes the first web based resource, and (ii) specifies that the one or more partner web based resources have one or more data-sharing agreements with the first web based resource;

responsive to the request for which the indication is received, provide, to the web server, a code segment that is configured to send, to one or more respective entities associated with the one or more partner web based resources specified in the co-operative, a second request to share, according to the one or more data-sharing agreements, shared user data with the first web based resource, the shared user data collected by the one or more partner web based resources specified and being associated with the user device;

receive the shared user data directly from the one or more partner web based resources responsive to respective second requests that are generated when the code segment is executed at a time of rendering the first web based resource; and use the shared user data to re-market content to a user.

19. A content management system comprising:

one or more processors; and one or more memory elements including instructions that, when executed, cause the one or more processors to:

receive, from a web server, an indication of receipt of a request received by the web server from a user device, the request being to navigate to a first web based resource, wherein the request includes an appended cookie when the appended cookie one is available on the user device, the appended cookie having been loaded onto the user device based on a prior navigation request by the user device to the first web based resource;

identify one or more partner web based resources that are in a co-operative that (i) includes the first web based resource, and (ii) specifies that the one or more partner web based resources have one or more data-sharing agreements with the first web based resource;

responsive to the request for which the indication is received, provide, to the web server, a code segment that is configured to send, to one or more respective entities associated with the one or more partner web based resources specified in the co-operative, a second request to share, according to the one or more data-sharing agreements, shared user data with the first web based resource, the shared user data collected by the one or more partner web based resources specified and being associated with the user device;

receive the shared user data directly from the one or more partner web based resources responsive to respective second requests that are generated when the code segment is executed at a time of rendering the first web based resource; and use the shared user data to re-market content to a user.

* * * * *